(No Model)
H. D. BRUNDAGE.
BICYCLE SUPPORT.
No. 585,739. Patented July 6, 1897.
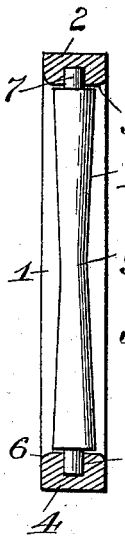
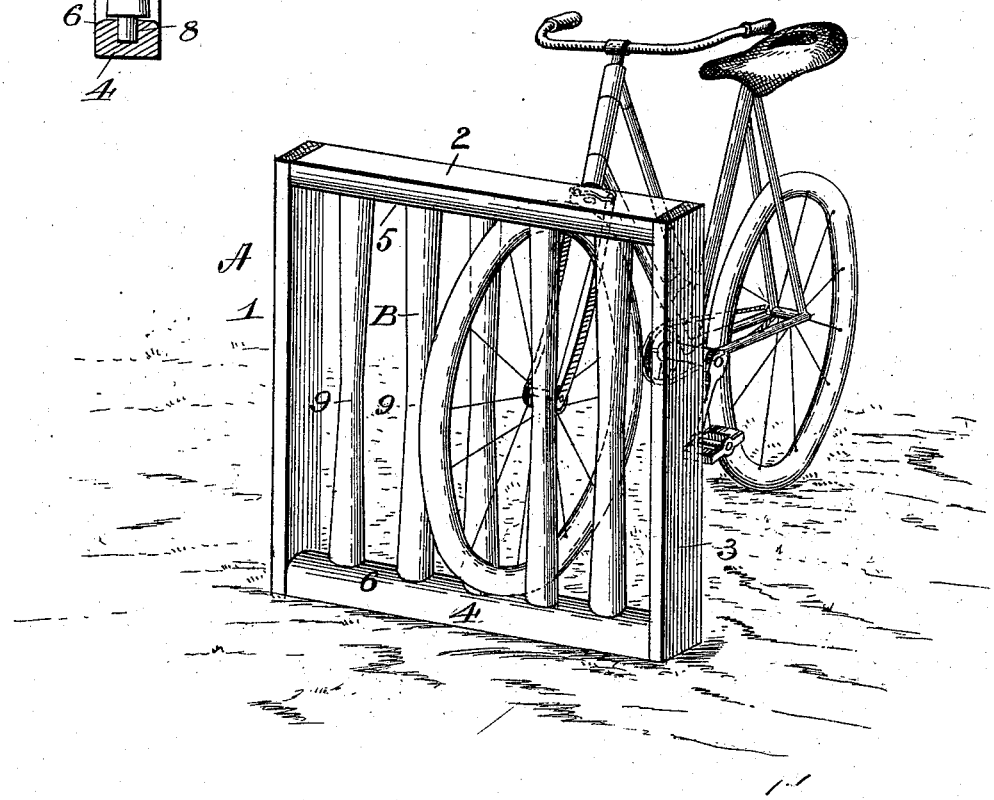
Witnesses
Franck L. Ouraud.
K. A. Nau.
Inventor
Howard D. Brundage.
by John Wedderburn
Attorney

UNITED STATES PATENT OFFICE.

HOWARD D. BRUNDAGE, OF NEWBURG, NEW YORK.

BICYCLE-SUPPORT.

SPECIFICATION forming part of Letters Patent No. 585,739, dated July 6, 1897.

Application filed June 27, 1896. Serial No. 597,160. (No model.)

*To all whom it may concern:*

Be it known that I, HOWARD D. BRUNDAGE, a citizen of the United States, residing at Newburg, in the county of Orange and State of New York, have invented certain new and useful Improvements in Bicycle-Supports; and I do hereby declare the following to be a full, clear, and exact description of the invention, such as will enable others skilled in the art to which it appertains to make and use the same.

My invention relates to bicycle-racks.

My object is to provide a simple, cheap, strong, and durable rack for bicycles which will be adapted to hold the machines in a highly superior manner without injury thereto should they be accidentally struck or pushed into the rack.

A further object is to provide an improved rack for bicycles which, owing to its peculiar construction, will be adapted to readily accommodate bicycles having rims and tires of different sizes.

Having these and other minor objects in view, my invention consists of a bicycle-rack comprising the combination, with a frame, of vertical concave rollers journaled in the frame in substantially parallel relation and between which the wheel of the bicycle is received.

In the accompanying drawings, Figure 1 is a perspective view of my improved bicycle-rack in use, and Fig. 2 is a transverse section.

A designates the frame, which may be either square, rectangular, or of any other shape. In the present instance it is composed of four pieces 1, 2, 3, and 4. The horizontal pieces 2 and 4 have their edges rounded, as at 5 and 6, respectively, so that the tire of the bicycle-wheel will not be injured while it is being placed within the rack.

B designates a series of vertical rollers which are disposed in parallel relation. Each roller is provided with reduced journals 7 and 8, which are loosely received in the upper and lower pieces of the frame, so that the rollers are adapted for easy rotation. If preferable, a spindle could be substituted for the reduced ends of the roller, or the ends of the roller might be provided with circular pockets and cylindrical lugs be employed on the frame and projecting into the pockets. The rollers are concaved, the lowest part of the concavity being located at a point intermediate the ends of the roller, as at 9.

The advantages of the aforegoing construction are obvious, but will now be briefly enumerated.

When the wheel of the bicycle is pressed together between two adjacent rollers, said rollers rotate freely, so that the wheel is firmly wedged in position, but without any resulting injury. The curved or rounded edges of the upper and lower pieces of the frame allow the wheel to advance without hindrance and prevent injury to the tire. Owing to the fact that the rollers are concaved they are adapted to accommodate wheels having tires and rims of different sizes.

Having now described my invention, what I claim as new, and desire to secure by Letters Patent, is—

In a bicycle-rack, the combination with a frame, of a series of vertically-disposed concaved rollers journaled in the frame and having their axes located in parallel relation and between which the bicycle-wheel is received.

In testimony whereof I have signed this specification in the presence of two subscribing witnesses.

HOWARD D. BRUNDAGE.

Witnesses:
HARRY L. WELLS,
OLIVER B. COLLARD.